Oct. 24, 1950     R. L. DICKEY     2,526,854
BASE
Filed May 24, 1948
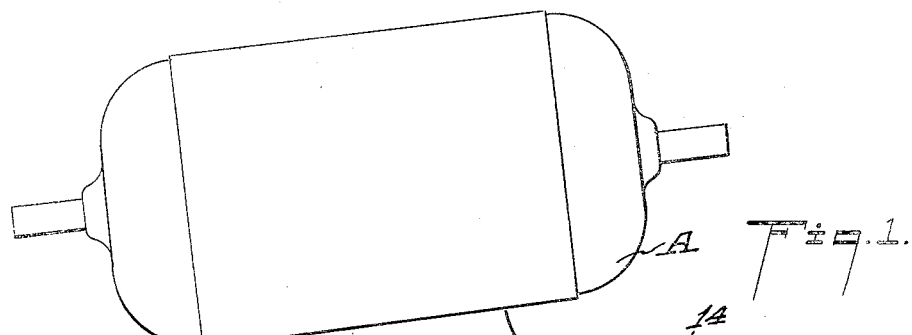
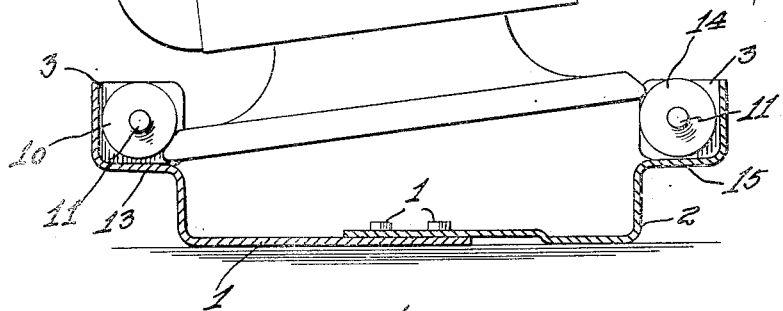
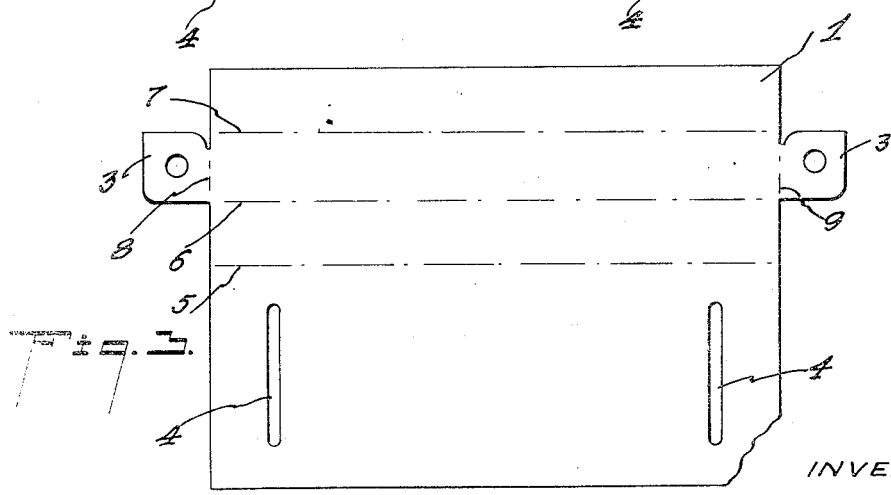
INVENTOR:
R. L. Dickey
by O O Martin
ATTORNEY.

Patented Oct. 24, 1950

2,526,854

UNITED STATES PATENT OFFICE 2,526,854

BASE

Ralph L. Dickey, Fullerton, Calif.

Application May 24, 1948, Serial No. 28,765

5 Claims. (Cl. 248—23)

This invention relates to means for mounting electric motors and other tool equipment having rectangular bases, and has for its object to provide a device which is so inexpensive and simple that a number of such devices may be employed in shops where similar motors are required to serve the tool equipment of the shop, to the end that one motor may replace the several motors ordinarily employed. Other objects and the many advantageous features of the invention will be better understood from the following detailed description and by referring to the accompanying drawings of which:

Fig. 1 is a side elevational view showing a method employed to mount a motor within the device of the invention.

Fig. 2 is a fragmentary plan view of one end of the motor mount; and

Fig. 3 shows a blank from which the mount of the invention is formed.

In the embodiment of the invention illustrated in the drawings, the motor mount is composed of parts 1 and 2 which may be substantially alike and the desecription of one of these parts will mostly apply to the other part also. As indicated in Fig. 3, each of these parts is made from a rectangular blank of somewhat resilient material having ears 3 projecting from the side edges thereof, and the body portion thereof is pierced to provide two or more parallel elongated perforations 4. The blank is folded on the lines 5, 6, 7, 8 to form a cradle for a roller 10, the shaft 11 of which extends through perforations of ears 3, shelves 13, 15 being provided below the rollers in forming the cradle.

When both parts are made up in this manner and assembled as indicated in Fig. 2, they may be clamped in position on a support by means of screws or bolts 12 to form the mount for a motor A, or any other mechanical or electrical device having a base similar to a motor base.

The motor is mounted in position, in the manner indicated in Fig. 1, by placing one edge of the motor base on the shelf 13 which is so formed when the blank is bent into shape as above described. When the parts of the mount have been correctly assembled and adjusted to the size of the motor base to be clamped into position therein, it is found that the opposite edge of the motor base will come to rest on the roller 14 and that when the rollers are made from soft resilient material, such as rubber it is merely required to apply downward pressure to the motor to force this edge of the base into the space between the roller and the shelf 15 of the part 2.

It is the important feature of my invention that the motor will be held securely in position below the rollers and that any pull or push on the motor shaft in the direction of parallel to the roller axis will have no tendency to shift the position of the motor within the mount or dislodge it therefrom. The motor mount can be made from very thin sheet metal and it will hold the motor on any support to which the mount is fastened, without danger of displacement or vibrations. Should it be found however that the part of the mount clamped in position on top of the other part does not come to rest against the support, it is merely required slightly to offset the upper part, substantially as indicated at 16 in Fig. 1.

It is seen from the above description that a number of these mounts may be clamped in position in various locations in a shop and be served by a single motor, which may be quickly moved from place to place, and rigidly mounted in position, thereby to eliminate the expense of having a separate motor for each piece of machine equipment within the shop.

I claim:

1. A mount for a motor having a base comprising, a cradle, a pair of resilient rollers seated in said cradle in parallel spaced relation to each other, the motor being mountable in the cradle by placing one side edge of its base against the cradle beneath one of said rollers, downward pressure on the motor causing the opposite edge of its base to pass the other roller and tightly to lodge in the cradle beneath the roller.

2. A mount for a motor having a base comprising, a cradle, a pair of resilient rollers seated in said cradle in parallel spaced relation to each other, means for adjusting the distance between said rollers, the motor being mountable in the cradle by placing one side edge of its base against the cradle beneath one of said rollers, downward pressure on the motor causing the opposite edge of its base to pass the other roller and tightly to lodge in the cradle beneath the roller.

3. A mount for a motor having a base comprising, a cradle having shelves at the side edges thereof, a pair of resilient rollers seated in said cradle above said shelves in parallel spaced relation to each other, the motor being mountable in the cradle by placing one side edge of its base against the cradle shelf beneath one of said rollers, downward pressure on the motor causing the opposite side edge of its base to pass the other roller and tightly to lodge on the cradle shelf beneath this other roller.

4. A mount for a motor having a base comprising, a cradle, a pair of resilient rollers seated in said cradle in parallel spaced relation to each other, the motor being mountable in the cradle by placing one side edge of its base against the cradle beneath one of said rollers, downward pressure on the motor causing the opposite edge of its base to pass the other roller and tightly to lodge in the cradle beneath the roller, the cradle being made in two parts relatively adjustable to suit the size of motor to be mounted.

5. A mount for a motor having a base comprising, a cradle, a pair of resilient rollers seated in said cradle in parallel spaced relation to each other, the motor being mountable in the cradle by placing one side edge of its base against the cradle beneath one of said rollers, downward pressure on the motor causing the opposite edge of its base to pass the other roller and tightly to lodge in the cradle beneath the roller, the cradle being made in two parts relatively adjustable to suit the size of motor to be mounted, and means for clamping the cradle in position on a support.

RALPH L. DICKEY.

REFERENCES CITED

The following references are of record in the file of this patent:

UNITED STATES PATENTS

| Number | Name | Date |
| --- | --- | --- |
| 1,876,844 | Boock | Sept. 13, 1932 |
| 2,433,693 | Hall | Dec. 30, 1947 |